(12) United States Patent
Norton et al.

(10) Patent No.: US 9,784,157 B2
(45) Date of Patent: Oct. 10, 2017

(54) SYSTEM AND METHOD FOR EXHAUST TREATMENT

(75) Inventors: Daniel George Norton, Niskayuna, NY (US); Stanlee Teresa Buddle, Gloversvile, NY (US); Dan Hancu, Clifton Park, NY (US); Benjamin Hale Winkler, Albany, NY (US); Ashish Balkrishna Mhadeshwar, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/731,171

(22) Filed: Mar. 25, 2010

(65) Prior Publication Data
US 2017/0234184 A1    Aug. 17, 2017

(51) Int. Cl.
*F01N 3/20* (2006.01)
*F01N 3/08* (2006.01)
(Continued)

(52) U.S. Cl.
CPC .......... *F01N 3/0885* (2013.01); *F01N 3/206* (2013.01); *F01N 3/208* (2013.01); *F01N 3/2013* (2013.01);
(Continued)

(58) Field of Classification Search
CPC ........ F01N 3/103; F01N 3/106; F01N 3/2013; F01N 3/2033; F01N 3/208; F01N 3/36; F01N 3/38; F01N 13/009; F01N 2240/14; F01N 2240/16; F01N 2250/04; F01N 2260/04; F01N 2430/08; F01N 2560/026; F01N 2560/06; F01N 2560/07; F01N 2570/12; F01N 2570/14; F01N 2610/03;
(Continued)

(56) References Cited

U.S. PATENT DOCUMENTS 7,021,047 B2    4/2006  Hilden et al.
7,401,462 B2    7/2008  Naik et al.
(Continued)

FOREIGN PATENT DOCUMENTS

DE        10026762 A1    12/2001
WO      2006/066043 A1     6/2006

OTHER PUBLICATIONS

PCT Search Report issued in connection with corresponding WO Patent Application No. US2011/027652 filed on Mar. 9, 2011.
(Continued)

*Primary Examiner* — Jorge Leon, Jr.
(74) *Attorney, Agent, or Firm* — Jean K. Testa; Fletcher Yoder, P.C.

(57) ABSTRACT

According to various embodiments, an exhaust treatment system includes a catalyst that is in direct contact with an exhaust stream, at least one sensor that senses a system parameter and produces one or more signals corresponding to the system parameter, and a controller that is configured to receive the one or more signals and control catalyst performance based on the one or more signals by regenerating the catalyst. Regenerating the catalyst includes increasing a temperature of the exhaust stream flowing to the catalyst and directing a reductant injector to adjust a flow rate of reductant being injected into the exhaust stream flowing to the catalyst.

25 Claims, 7 Drawing Sheets

(51) Int. Cl.
*F01N 11/00* (2006.01)
*F01N 13/00* (2010.01)
*F01N 3/38* (2006.01)
*F01N 3/10* (2006.01)
*F01N 3/36* (2006.01)

(52) U.S. Cl.
CPC .......... *F01N 11/002* (2013.01); *F01N 13/008* (2013.01); *F01N 3/103* (2013.01); *F01N 3/106* (2013.01); *F01N 3/2033* (2013.01); *F01N 3/36* (2013.01); *F01N 3/38* (2013.01); *F01N 13/009* (2014.06); *F01N 2240/14* (2013.01); *F01N 2240/16* (2013.01); *F01N 2250/04* (2013.01); *F01N 2260/04* (2013.01); *F01N 2430/08* (2013.01); *F01N 2560/026* (2013.01); *F01N 2560/06* (2013.01); *F01N 2560/07* (2013.01); *F01N 2570/12* (2013.01); *F01N 2570/14* (2013.01); *F01N 2610/03* (2013.01); *F01N 2610/146* (2013.01); *F01N 2900/0418* (2013.01); *F01N 2900/0422* (2013.01); *F01N 2900/08* (2013.01); *F01N 2900/1402* (2013.01); *F01N 2900/1404* (2013.01); *F01N 2900/1411* (2013.01); *F01N 2900/1602* (2013.01); *F01N 2900/1621* (2013.01); *Y02T 10/24* (2013.01); *Y02T 10/47* (2013.01)

(58) Field of Classification Search
CPC ....... F01N 2610/146; F01N 2900/0418; F01N 2900/0422; F01N 2900/08; F01N 2900/1402; F01N 2900/1404; F01N 2900/1411; F01N 2900/1602; F01N 2900/1621; Y02T 10/24; Y02T 10/47
USPC .......... 60/274, 276, 277, 285, 286, 287, 295, 60/299, 301, 303, 320
See application file for complete search history.

(56) References Cited

U.S. PATENT DOCUMENTS

| | | |
|---|---|---|
| 2002/0104312 A1 | 8/2002 | Hoffman |
| 2007/0000239 A1 | 1/2007 | Liu |
| 2008/0066455 A1 | 3/2008 | Viola |
| 2008/0155967 A1 | 7/2008 | Maus |
| 2008/0236142 A1* | 10/2008 | Sloane ............... B01D 53/9409 60/274 |
| 2010/2250616 | 3/2010 | Lee et al. |
| 2010/0132337 A1* | 6/2010 | Hirata .................... B01D 46/42 60/286 |
| 2011/0072790 A1* | 3/2011 | Schmieg ................. F01N 3/106 60/277 |

OTHER PUBLICATIONS

PCT Invitation to pay additional fees issued in connection with corresponding WO Patent Application No. US11/27652 filed on Mar. 9, 2011.
U.S. Appl. No. 12/713,617, filed Feb. 26, 2010, Dan Hancu.

* cited by examiner

US 9,784,157 B2

SYSTEM AND METHOD FOR EXHAUST TREATMENT

BACKGROUND

The subject matter disclosed herein relates to a system and a method for improving performance of an exhaust gas after-treatment system, and more particularly, to regenerating a catalyst to improve its nitrogen oxide ($NO_x$) conversion efficiency.

Current emission control regulations encourage the use of catalysts in the exhaust systems of vehicles in order to convert carbon monoxide (CO), hydrocarbons (HC), and $NO_x$ produced during engine operation into less harmful exhaust gases. Vehicles equipped with diesel engines may offer the benefit of increased fuel economy. Such vehicles may benefit from exhaust after-treatment systems that employ one or more catalysts to assist in chemically converting $NO_x$, HC, CO, and other pollutants into less harmful compounds prior to discharge of the exhaust gases to the environment.

However, in such traditional catalyst systems, soot, HC, and other undesirable species may adsorb on the surface of the catalyst, thus contaminating the catalyst and reducing its conversion efficiency. Heating the catalyst systems to a temperature sufficient to desorb or oxidize the HC, for a predetermined amount of time, may regenerate the catalyst by desorbing or oxidizing the unwanted adsorbed species, thereby removing deposits of undesirable materials from the catalyst.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, an exhaust treatment system includes a catalyst that is in direct contact with an exhaust stream, at least one sensor that senses a system parameter and produces one or more signals corresponding to the system parameter, and a controller that is configured to receive the one or more signals and control catalyst performance based on the one or more signals by regenerating the catalyst. Regenerating the catalyst includes increasing a temperature of the exhaust stream flowing to the catalyst and directing a reductant injector to adjust a flow rate of reductant being injected into the exhaust stream flowing to the catalyst.

In a second embodiment, a method for treating an exhaust includes passing an exhaust stream in direct contact with a catalyst, sensing a system parameter by at least one sensor and producing one or more signals corresponding to the system parameter, transmitting the one or more signals to a controller, and controlling catalyst performance based on the one ore more signals by regenerating the catalyst. Regenerating the catalyst includes increasing a temperature of the exhaust stream flowing to the catalyst and adjusting a flow rate of a reductant being injected into the exhaust stream flowing to the catalyst.

In a third embodiment, a fuel-burning system includes a catalyst that is connected to a source of an exhaust stream and is in direct contact with the exhaust stream, a sensor that senses a concentration of NOx in the exhaust stream and produces a signal corresponding to the concentration of NOx in the exhaust stream, and a controller that is configured to receive the signal, compare a value of the concentration of NOx in the exhaust stream with a setpoint, and increase a temperature of the exhaust stream flowing to the catalyst and inject a reductant into the exhaust stream flowing to the catalyst to oxidize hydrocarbons disposed on the catalyst if the value of the concentration of NOx in the exhaust stream is greater than the setpoint.

In a fourth embodiment, a method for regenerating a catalyst includes comparing a measure of catalyst performance against a performance setpoint and initiating a burn-off operation if the measure of catalyst performance is less than the performance setpoint, comparing a duration since a previous burnoff operation against a burnoff schedule setpoint and initiating the burnoff operation if the duration since the previous burnoff operation is greater than the burnoff schedule set point, comparing a duration since initiating the burnoff operation against a burnoff duration setpoint and stopping the burnoff operation is the duration since initiating the burn off operation is greater than the burnoff duration setpoint, and updating a catalyst history with burnoff information.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
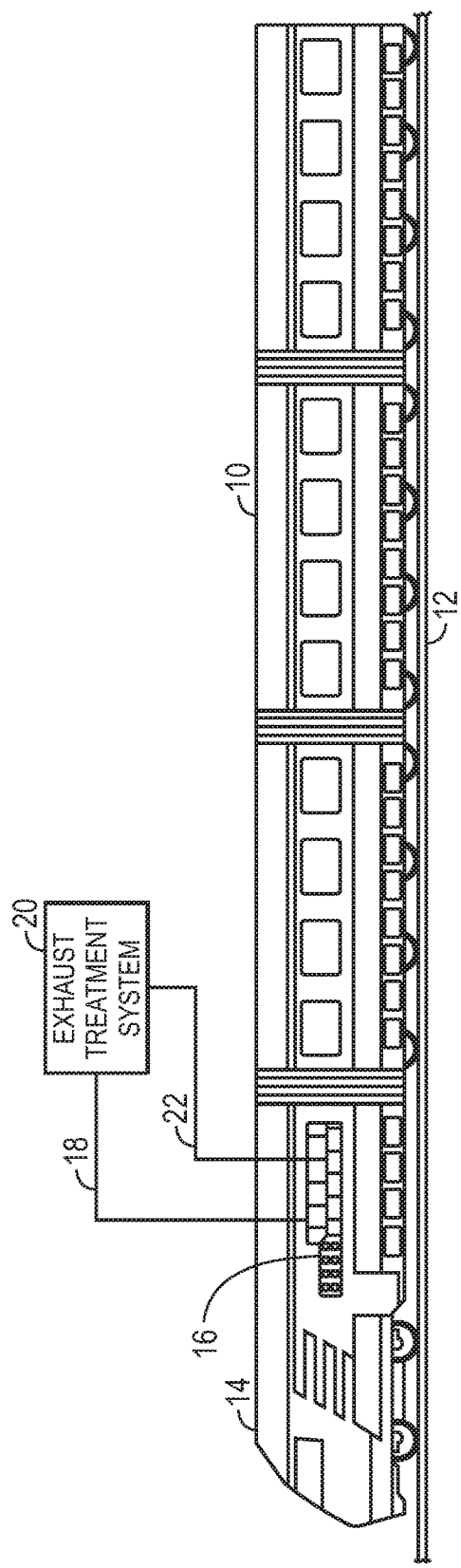
FIG. 1 is schematic diagram of a locomotive engine that uses an exhaust treatment system in accordance with the technique disclosed herein for regeneration of a catalyst.

FIG. 1 is a schematic diagram of a railroad locomotive that uses a diesel engine exhaust treatment system in accordance with one embodiment of the present technique for regeneration of catalyst. A train 10 runs on a rail 12. A locomotive 14 includes a diesel engine 16 with at least one cylinder to drive the train 10. The locomotive 14 also includes an engine exhaust line that passes exhaust gases 18 from the diesel engine 16 to an exhaust treatment system 20, which treats the exhaust to reduce the concentration of pollutants. The exhaust treatment system 20 includes catalyst that may be used for exhaust treatment and the catalyst may be regenerated based on catalyst performance as described in more detail below. Discharge exhaust gases 22 exit from the exhaust treatment system 20 through an exhaust discharge line that may be routed to the atmosphere. Although FIG. 1 shows a locomotive, the present technique may be applied to other systems that employ catalyst for exhaust treatment. For example, the present technique may be employed in other vehicles that have combustion engines, such as passenger vehicles, buses, trucks, tractors, off-road vehicles, marine vehicles, transport vehicles, and stationary devices, such as generators and boilers or the like.

According to an exemplary embodiment of the present technique, vehicles equipped with diesel engines may offer the benefit of increased fuel economy. Such vehicles typically produce pollutant gases, such as CO, HC, $NO_x$ and the like, during engine operation. Emission control regulations encourage the use of catalysts in the exhaust treatment systems of vehicles in order to convert these pollutant gases into less harmful exhaust gases. In certain embodiments, these engines, therefore, may be equipped with exhaust treatment systems that include after-treatment devices, such as a hydrocarbon selective catalytic reduction (HC-SCR) catalyst, in which $NO_x$ is continuously removed by reacting with active reductants to produce nitrogen. Such reductants may include hydrocarbon compounds, such as diesel or gasoline. In another embodiment of the invention, a typical exhaust treatment system may also include other catalysts coupled upstream of the HC-SCR catalyst to convert HC and CO in the exhaust gas mixture into less harmful gases.

Typically, soot, sulfur containing compounds, and unreacted HC adsorb on the surface of the catalyst during operation of the engine. The adsorbed species block the active surface of the catalyst from the exhaust stream, thereby reducing the efficiency of the catalyst. At some point, the efficiency of the catalyst may be reduced to a point that the pollutant gases, such as $NO_x$, are not sufficiently removed from the exhaust stream to meet emission control regulations. In other words, the catalyst may be said to be deactivated. Therefore, there is usually a need to heat the catalyst systems periodically to a temperature sufficient to desorb or oxidize the HC, or in other words, above the temperature at which the HC can be "burned off" of the catalyst, for a predetermined amount of time, to clean the surface of the catalyst. This process of desorbing or oxidizing unwanted adsorbed species is known as "regenerating" or reactivating the catalyst, as "burnoff," or as oxidizing the HC. Examples of temperatures at which the HC-SCR catalyst may be regenerated include, but are not limited to, between approximately 400 to 600 degrees Celsius, 425 to 500 degrees Celsius, and 440 to 460 degrees Celsius. Furthermore, examples of oxygen concentrations at which the HC-SCR catalyst may be regenerated include, but are not limited to, greater than approximately 3 volume %, 5 volume %, or even 9 volume %. By regenerating the catalyst periodically or whenever catalyst efficiency is reduced in accordance with the embodiments described herein, the overall lifetime and performance of the catalyst may be improved.

Effective regeneration of catalyst can be done in accordance with the requirements described above by performing regeneration of the catalyst based on catalyst performance. In one aspect of the present technique, a $NO_x$ sensor located on the exhaust line downstream of the HC-SCR catalyst is used to indicate when the catalyst should be regenerated. In other words, the concentration of $NO_x$ in the exhaust stream is a measure of catalyst performance. In another aspect of the present technique, a schedule based on observations or predictions of catalyst performance is used to regenerate the HC-SCR catalyst periodically.

Figure 2:
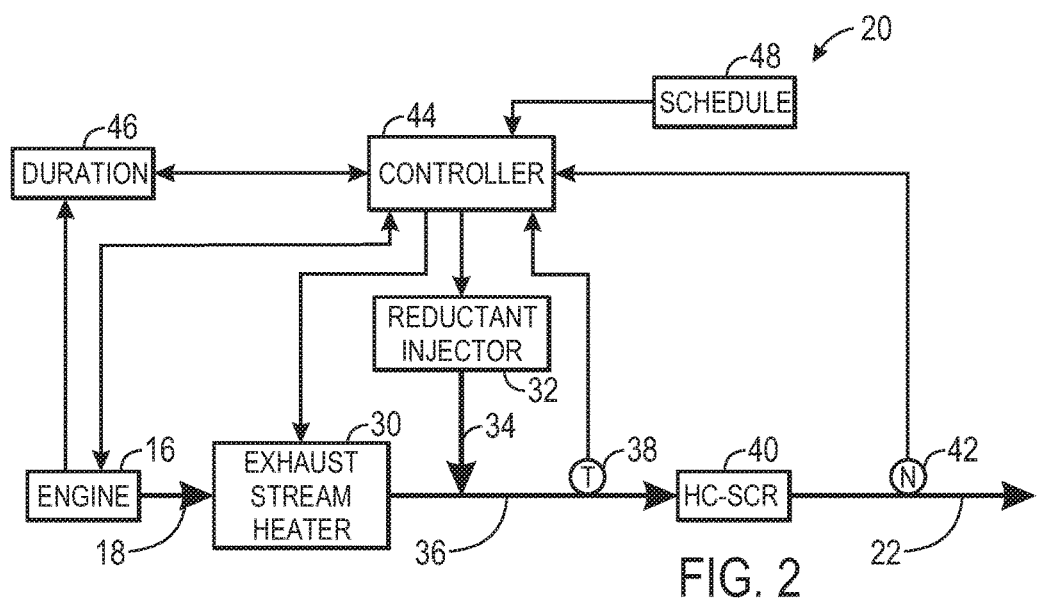
FIG. 2 is a schematic diagram of an exemplary system for regeneration of catalyst in an engine exhaust treatment system in accordance with one embodiment of the present invention.

Turning to the exhaust treatment system 20 in more detail, FIG. 2 is a schematic diagram of an exemplary exhaust treatment system for regeneration of catalyst in accordance with aspects of the present technique. Referring to FIG. 2, an engine 16 produces exhaust gases 18 during operation. The engine 16 may include different types of internal combustion engines, such as, but not limited to, diesel engines, gasoline engines, reciprocating engines, rotary engines, turbine engines, or any engine that produces exhaust gases. In addition, the engine 16 may refer to any device that produces exhaust gases 18, such as a fuel-burning system. The exhaust gases 18 are discharged from the engine 16 to an exhaust stream heater 30, which may include devices configured to increase a temperature of the exhaust gases 18. Specific embodiments of the exhaust stream heater 30 are discussed in detail below.

Downstream of the exhaust stream heater 30 may be a reductant injector 32 configured to inject a reductant 34 into the stream of heated exhaust gases 36. The reductant injector 32 may include a reservoir of reductant 34 or connections to a source of reductant elsewhere in the diesel engine 16 or locomotive 14. Moreover, the reductant injector 32 may include a metering and control device to enable a specified amount of reductant 34 to be injected when required. The amount of injected reductant may be specified based on either operational data or theoretical calculations. Alternatively, the amount of injected reductant may be adjusted based on measurements of a $NO_x$ sensor 42 and/or an exhaust temperature sensor 38. Examples of materials that may be used as reductants include, but are not limited to, diesel, gasoline, ethanol, or any combinations thereof. In addition, a ratio of carbon atoms in the reductant 34 to nitrogen atoms in the $NO_x$ in the untreated exhaust gases, referred to as a C:N ratio, may be determined to adjust the flow rate of reductant. Because the reductant 34 may also be used as fuel for the engine 16, an optimum C:N ratio may be adjusted to provide the least desired conversion of $NO_x$ at a lowest fuel penalty.

The exhaust treatment system 20 also includes the exhaust temperature sensor 38 disposed in the discharge line from the exhaust stream heater 30 to measure the temperature of the heated exhaust gases 36. Although shown downstream of the injection point of reductant 34, the temperature sensor 38 may be located anywhere downstream of the exhaust stream heater 30.

The heated exhaust gases 36 are supplied to a HC-SCR catalyst 40 that is in fluid communication with the engine 16 and in direct contact with the heated exhaust gases. The HC-SCR catalyst 40 may be disposed in an enclosure or container. The HC-SCR catalyst container is typically made of a stainless steel casing, a thermal insulator, and honeycomb or foam support. The HC-SCR catalyst container is typically manufactured by coating the support with a metal or ceramic material with a high surface area, such as metal oxide particles that are impregnated with noble metals. The material of the HC-SCR catalyst 40 is deposited on the high surface area material of the container. In the formation of such a container, a sintered, dense and hardened ceramic substrate, which can be in the shape of a honeycomb, random shaped pore openings, wagon-wheel, spiral, pellets or the like, is coated with a slurry of a high surface area material. The HC-SCR catalyst 40 is then applied to the slurry-coated substrate, typically by application of a solution of a salt. In other embodiments, the HC-SCR catalyst 40 may be prepared according to methods different from that described above. For example, some embodiments may use different materials, configurations, or steps. In further embodiments, the steps described above may be performed in a different order or steps may be added or omitted.

The HC-SCR catalyst 40 typically, but not necessarily, includes a noble metal, such as, for example silver. In other embodiments, the HC-SCR catalyst 40 may include oxides of various transition metals, such as iron or copper, or zeolites. A number of reactions may occur when the heated exhaust gases 36 contact the HC-SCR catalyst 40 in the presence of the reductant 34. Primarily, $NO_x$ reacts with the reductant and oxygen present in the heated exhaust gases 36 to produce nitrogen, water, and carbon dioxide ($CO_2$). The HC-SCR catalyst 40 increases the rate of the $NO_x$ chemical reactions without being consumed by the reactions itself. Thus, when using the HC-SCR catalyst 40, the discharge exhaust gases 22 in the exhaust discharge line may have less $NO_x$ than allowed by emission control regulations. To determine the concentration of $NO_x$ in the discharge exhaust gases 22, the $NO_x$ sensor 42 may be disposed in the exhaust discharge line. The $NO_x$ sensor 42 produces a signal corresponding to the concentration of $NO_x$ and may be configured to be sensitive to a $NO_x$ concentration near a limit specified by emission control regulations. For example, the $NO_x$ sensor 42 may be configured to generate a signal if the $NO_x$ sensor 42 detects a concentration of $NO_x$ greater than approximately 50 ppm, 100 ppm, 150 ppm, or even 200 ppm.

Turning next to the control aspects of the exhaust treatment system 20, FIG. 2 includes a controller 44. Examples of technologies that may be used for the controller 44 include, but are not limited to, open or closed loop control, linear or non-linear control, model predictive control, programmable logic controllers (PLC), distributed control systems (DCS), or advanced control. The controller 44 receives signals from various sensors in the exhaust treatment system 20 and sends signals to various devices to control the regeneration of the HC-SCR catalyst 40. The sensors sense system parameters that are related in some way to catalyst performance and produce signals corresponding to the system parameters. Examples of system parameters include, but are not limited to, a concentration of $NO_x$ in the discharge exhaust gases 22 (post-catalyst), a duration the HC-SCR catalyst 40 has been in direct contact with the exhaust gases 36 since the HC-SCR catalyst was last regenerated, an amount of exhaust that has been in direct contact with the HC-SCR catalyst since the HC-SCR catalyst was last regenerated, a mass or volumetric flow rate of exhaust that has been in direct contact with the HC-SCR catalyst since the HC-SCR catalyst was last regenerated, the temperature of the heated exhaust gases 36 flowing to the HC-SCR catalyst, a concentration of $NO_x$ in the heated exhaust gases 36 (pre-catalyst), or any combination thereof. Thus, the controller 44 may help the engine 16 to operate within targets established by emission control regulations.

In certain embodiments, open-loop control and scheduling of periodic regeneration cycles is used to control the regeneration of the HC-SCR catalyst 40. For example, the exhaust treatment system 20 may include a duration module 46 that monitors operation of the engine 16 and records information regarding regeneration, such as operation time and engine speed and load. In particular embodiments, the duration module 46 may monitor how long the engine 16 runs, how long regeneration cycles last, the regeneration temperature, and other duration information. Thus, the duration module 46 may receive operational signals from the engine 16 indicating whether the engine is running or not and signals from the controller 44 indicating when the last regeneration cycle completed. Correlating this information, the duration module 46 may send signals to the controller indicating how long the engine 16 has operated since the last regeneration cycle and the corresponding operating conditions. Thus, time while the engine 16 is not producing exhaust gases 18 will not be considered as operating time for the HC-SCR catalyst 40.

Figure 3:
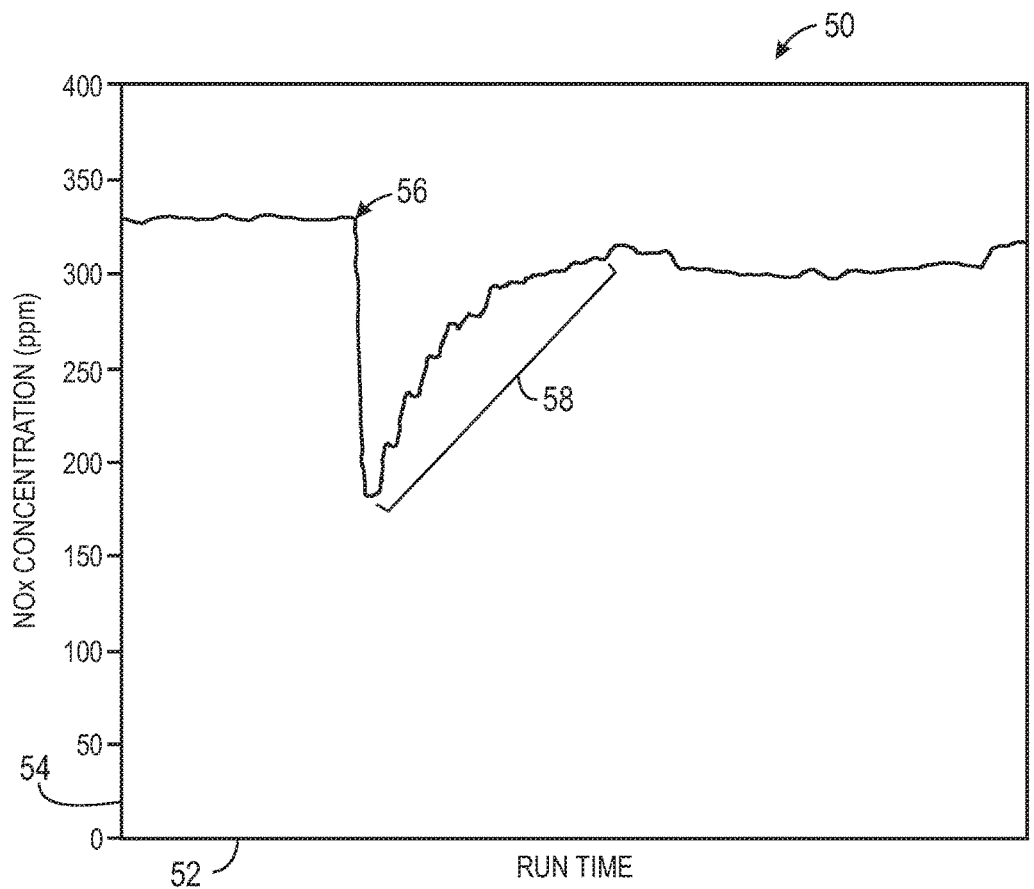
FIG. 3 is a graph showing $NO_x$ concentration as a function of engine run time in accordance with one embodiment of the present invention.

In conjunction with the duration module 46, certain embodiments of the exhaust treatment system 20 utilizing open-loop control may include a schedule module 48. Based on observations made during testing or operation of the engine 16 and using the $NO_x$ sensor 42, a curve 50 of engine operating time and $NO_x$ concentration may be developed as illustrated in FIG. 3. Alternatively, instead of actual data collected from the engine 16, the curve 50 may be based on theoretical calculations or simulations. An x-axis 52 may represent the run time of the engine and a y-axis 54 may represent the $NO_x$ concentration in parts per million (ppm). In FIG. 3, no reductant is being injected into the heated exhaust gases 36 at the beginning of the curve 50 and the $NO_x$ concentration is high. At a point 56, reductant is injected and the $NO_x$ concentration quickly decreases. However, as the engine 16 continues to operate and reductant continues to be injected, the $NO_x$ concentration gradually increases as indicated by bracket 58. This may correspond to the adsorption of soot and HC on the surface of the catalyst. Eventually, the concentration of $NO_x$ approaches a point when reductant injection does not result in sufficient $NO_x$ reduction and thus, performance of the catalyst becomes unacceptable. Using data, such as that plotted in curve 50, a duration may be determined that enables the engine 16 to run before exceeding emission control targets. Analyzing curves similar to curve 50 under varying operating conditions, a maximum duration the engine 16 may run without exceeding emission control targets may be determined. The maximum duration may be used to program the schedule module 48 of FIG. 2, which sends a signal corresponding to the maximum duration to the controller 44. In certain embodiments, the maximum duration values may include, but are not limited to, between approximately 5 minutes to 5 hours, 15 minutes to 4 hours, 25 minutes to 3 hours, or 50 to 70 minutes. The controller 44 may compare engine run time since the last regeneration cycle using information from the duration module 46 with the maximum duration from the schedule module 48 to determine when the catalyst may be regenerated to enable the engine 16 to continue operating within emission control targets.

Instead of open-loop control, in certain embodiments closed-loop control may be used determine when to conduct regeneration cycles. For example, the $NO_x$ sensor 42 of FIG. 2 may send a signal to the controller 44 indicating the concentration of $NO_x$ in the discharge exhaust gases 22. In addition, the controller 44 may be programmed with a $NO_x$ threshold concentration based on emission control targets. Moreover, the threshold concentration may be set lower than the emission control target to account for any sensor error and/or system delay. One example of a threshold concentration may be approximately 150 ppm $NO_x$. Other threshold concentrations may be used depending on the particular emission control regulations and type of vehicle involved, for example passenger vehicle, truck, or locomotive, which may differ. The controller may initiate a regeneration cycle when the $NO_x$ concentration measured by $NO_x$ sensor 42 nears the threshold concentration. When regeneration occurs, the $NO_x$ concentration measured by $NO_x$ sensor 42 decreases, thereby maintaining operation of the engine 16 in compliance with emission control regulations. In addition to $NO_x$, other measures of catalyst performance, such as, but not limited to, HC, carbon dioxide, methane, ozone, sulfur dioxide, and soot, may be monitored to determine when to initiate regeneration depending on the particular requirements of emission control regulations or as regulations change.

Although discussed separately above, closed-loop and open-loop methods of catalyst regeneration control may be combined in particular embodiments. For example, open-loop control may be the primary method of control and the HC-SCR catalyst may be regenerated on a periodic basis. However, closed-loop control may be used when the $NO_x$ concentration measured by $NO_x$ sensor 42 approaches the threshold concentration, even if regeneration is not currently scheduled according to open-loop control. Other methods of control and control loop configurations may be used to monitor catalyst performance and begin regeneration when needed to maintain compliance with emission control regulations.

With open-loop control, closed-loop control, or other methods of catalyst regeneration control, the controller 44 may operate in a similar manner to regenerate the HC-SCR catalyst 40. Namely, the controller 44 may send a signal to the exhaust stream heater 30 to increase the temperature of the exhaust gases 36 discharged to the HC-SCR catalyst 40. Particular embodiments of the exhaust stream heater 30 are discussed in detail below. If the controller 44 is operating in an open-loop mode, the controller may continue heating the exhaust gases 36 until the specified duration of the regeneration has elapsed. Alternatively, the exhaust temperature sensor 38 may send a signal corresponding to the temperature of the exhaust gases 36 to the controller 44. Thus, if the controller 44 is operating in a closed-loop mode, the controller may adjust the exhaust stream heater 30 to maintain the exhaust temperature at or near a setpoint that may be programmed into the controller 44.

With either method of controlling the temperature of the heated exhaust gases 36 described above or using other methods, the temperature is maintained above the temperature sufficient to desorb or oxidize the HC, or above the burnoff temperature, for a specified duration, which may be controlled using various methods. For example, using open-loop control, the controller 44 may be programmed with a regeneration duration that is long enough such that performance of the HC-SCR catalyst 40 enables emission control targets to be met. This duration may be based on data collected during testing or operation of the engine 16 and/or theoretical models or simulations. Alternatively, using closed-loop control, the controller 44 may continue regeneration until the $NO_x$ concentration as measured by $NO_x$ sensor 42 returns to a normal concentration of $NO_x$, which may correspond to the concentration of $NO_x$ in the discharge exhaust gases 22 when the HC-SCR catalyst is not deactivated. In addition, the duration of regeneration may be adjusted based on the temperature of the exhaust gases as measured by sensor 38. Thus, not only may sensor 38 be used to indicate the temperature of the exhaust gases 36 during regeneration, but sensor 38 may also be used to indicate the temperature of the exhaust gases 36 during normal operation. High exhaust gas temperatures during normal operation, outside of regeneration, may cause the formation of deposits that are more difficult to remove. Thus, based on the exhaust gas temperature data collected during normal operation, the controller 44 may extend the duration of regeneration or increase the regeneration temperature to help remove the more difficult deposits associated with increased operating temperatures.

The last signal shown in FIG. 2 coming from the controller 44 is one to the reductant injector 32. Based on signals received from the engine 16, the controller 44 may direct the reductant injector 32 to operate only when the engine is running, thereby conserving reductant inventory when reductant is not needed. Additionally, if the controller 44 is operating in a closed-loop mode, the controller may direct additional reductant 34 to be injected if the concentration of $NO_x$ measured by sensor 42 begins to increase. Moreover, during regeneration, the flow rate of reductant 34 may be adjusted, which the controller 44 may accomplish by sending an appropriate signal to the reductant injector 32.

Figure 4:
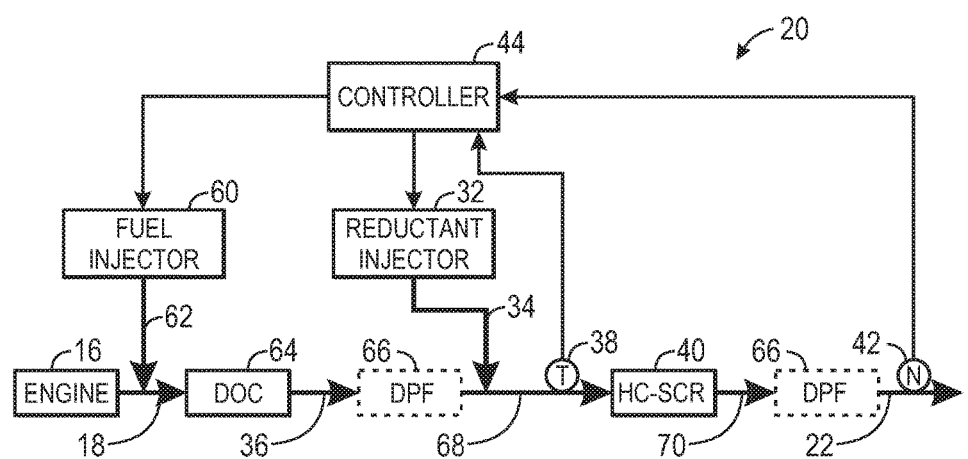
FIG. 4 is a schematic diagram of an exhaust treatment system using a diesel oxidation catalyst (DOC) in accordance with one embodiment of the present invention.

Turning to specific embodiments of the exhaust stream heater 30, FIG. 4 is a schematic diagram of an exhaust treatment system 20 that uses a DOC 64 as the exhaust stream heater. Those components in system 20 of FIG. 4 that are identical to components of FIG. 2 are identified using the same reference numerals used in FIG. 2. Downstream of the engine 16 may be a fuel injector 60 configured to inject a fuel 62 into the exhaust gases 18. Analogous to the reductant injector 32 described above, the fuel injector 60 may include a reservoir of fuel 62 or connections to a source of fuel elsewhere in the diesel engine 16 or locomotive 14. Moreover, the fuel injector 60 may include a metering and control device to enable a specified amount of fuel 62 to be injected when required. Examples of materials that may be used as fuels 62 include, but are not limited to, diesel and gasoline. The fuel injector 60 is typically used only when the DOC 64 functions as the exhaust stream heater 30.

Next, the exhaust gases 18 and fuel 62 are discharged to the DOC 64, which helps to reduce the concentration of pollutants in the exhaust gases 18. Although there may be some flexibility in the placement of the DOC 64, it may typically be located upstream of where the reductant 34 is injected. The DOC typically, but not necessarily, includes a noble metal, such as, for example palladium or platinum. A number of reactions may occur when the exhaust gases 18 and fuel 62 contact the DOC 64. Primarily, CO reacts with oxygen to produce $CO_2$. In addition, unburned HC in the exhaust gases 18 react with oxygen to produce $CO_2$ and water in a combustion reaction. When the DOC 64 is used as the exhaust stream heater 30, the injected fuel 62 also reacts with oxygen to produce $CO_2$ and water. The combustion reaction generates heat, so that the addition of injected fuel 62 in the exhaust gases 18 increases the temperature of the heated exhaust gases 36 discharged from the DOC 64. The controller 44 may operate the fuel injector 60 in an open-loop mode, directing a specified amount of fuel 62 to be injected during regeneration. Alternatively, the controller 44 may operate in a closed-loop mode and adjust the amount of fuel 62 to maintain the temperature of the heated exhaust gases 36 at or near a temperature setpoint. As with the HC-SCR catalyst 40, the DOC 64 increases the rate of the combustion chemical reactions without being consumed by the reactions itself.

Downstream of the DOC 64, the exhaust treatment system 20 of FIG. 4 may also include a diesel particulate filter (DPF) 66, which is configured to remove diesel particulate matter or soot. Although there may be some flexibility in the placement of the DPF 66, it may typically be located downstream of the DOC 64. Materials that may be used for the DPF 66 include, but are not limited to, cordierite, silicon carbide, ceramic fibers, metal fibers, paper, or any combinations thereof. As the DPF 66 primarily acts as a filter, the DPF does not normally increase the temperature of the exhaust gases 36 except when the DPF 66 is periodically heated to burn off accumulated soot. However, the timing of such DPF regeneration may not coincide with deactivated HC-SCR catalyst performance and thus, the DPF 66 is not considered part of the exhaust stream heater 30. In addition, the DPF 66 is an optional device and thus, is shown hatched in FIG. 4. If the DPF 66 is used downstream of the DOC 64, filtered, heated exhaust gases 68 are discharged from the DPF 66 and reductant 34 may be injected into the exhaust gases prior to being directed to the HC-SCR catalyst 40. Alternatively, the DPF 66 may be located downstream of the HC-SCR catalyst 40. If used in this location, unfiltered exhaust gases 70 may be discharged from the HC-SCR catalyst 40 to the DPF 66. Then, the discharge exhaust gases 22 will have been filtered by the DPF 66, have had $NO_x$ removed by the HC-SCR catalyst 40, and have had CO and unburned HC removed by the DOC 64. Other aspects of regeneration control are identical to that shown in FIG. 2 and described above. For simplicity, the duration module 46 and schedule module 48 are not shown in FIG. 4, although they may be used when the DOC 64 is used as the exhaust stream heater 30.

Figure 5:
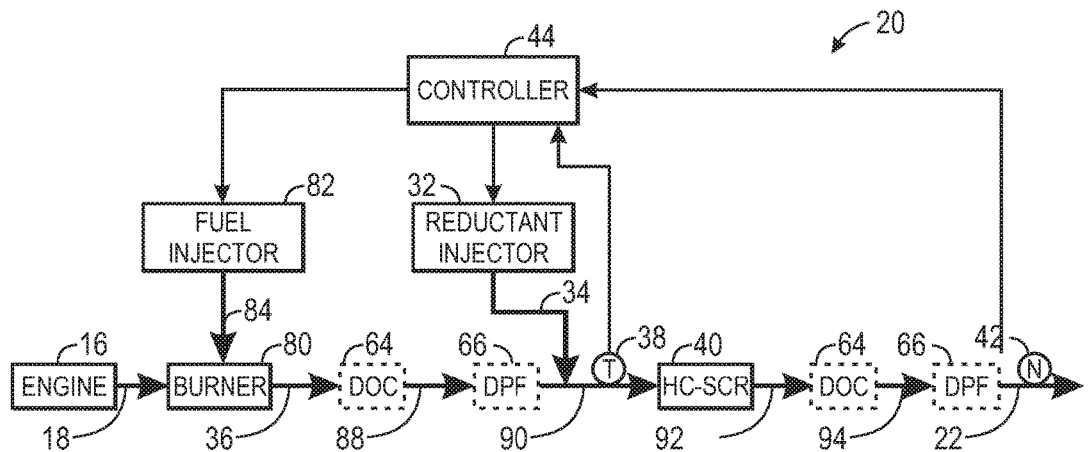
FIG. 5 is a schematic diagram of an exhaust treatment system using a burner in accordance with one embodiment of the present invention.

FIG. 5 is a schematic diagram of an exhaust treatment system 20 that uses a homogeneous burner 80 as the exhaust stream heater 30. Those components in system 20 of FIG. 5 that are identical to components of FIG. 2 are identified using the same reference numerals used in FIG. 2. The exhaust gases 18 may pass through the burner 80 located downstream of the engine 16. Although there may be some flexibility in the placement of the burner 80, it may typically be located upstream of where the reductant 34 is injected. A fuel injector 82 may be configured to inject a fuel 84 into the burner 80. Analogous to the fuel injector 60 used for the DOC 64, the fuel injector 82 may include a reservoir of fuel 84 or connections to a source of fuel elsewhere in the diesel engine 16 or locomotive 14. Moreover, the fuel injector 82 may include a metering and control device to enable a specified amount of fuel 84 to be injected when required. Examples of materials that may be used as fuels 84 include, but are not limited to, diesel and gasoline. The fuel injector 82 is typically used only when the burner 80 functions as the exhaust stream heater 30. When the burner 80 is used as the exhaust stream heater 30, a flame is created in which the injected fuel 84 reacts with oxygen to produce $CO_2$ and water in a combustion reaction. The combustion reaction generates heat, so that the addition of injected fuel 84 in the exhaust gases 18 increases the temperature of the heated exhaust gases 36 discharged from the burner 80. The burner 80 may also combust any unburned fuel from the engine 16.

Downstream of the burner 80, the exhaust treatment system 20 of FIG. 5 may optionally include the DOC 64 or the DPF 66, which are shown hatched in FIG. 5. If used, the exhaust gases 88 downstream of the DOC 64 may have less unburned HC and the exhaust gases 90 downstream of the DPF 66 may have less particulate matter. In particular, if both the DOC 64 and the DPF 66 are used, the DOC may typically be located upstream of the DPF 66 (the DPF 66 may be used without the DOC 64). During regeneration, the heated exhaust gases 90 are discharged to the HC-SCR catalyst 40. Alternatively, the combination of the DOC 64 and the DPF 66 may be located downstream of the HC-SCR catalyst 40. Then the exhaust gases 92 from which $NO_x$ has been removed may pass through the DOC 64, which discharges exhaust gases 94 from which unburned HC have been removed. After passing through the DPF 66, the discharge exhaust gases 22 have had particulate matter removed. Other aspects of regeneration control are identical to that shown in FIG. 2 and described above. For simplicity, the duration module 46 and schedule module 48 of FIG. 2 are not shown in FIG. 5, although they may be used when the burner 80 is used as the exhaust stream heater 30.

Figure 6:
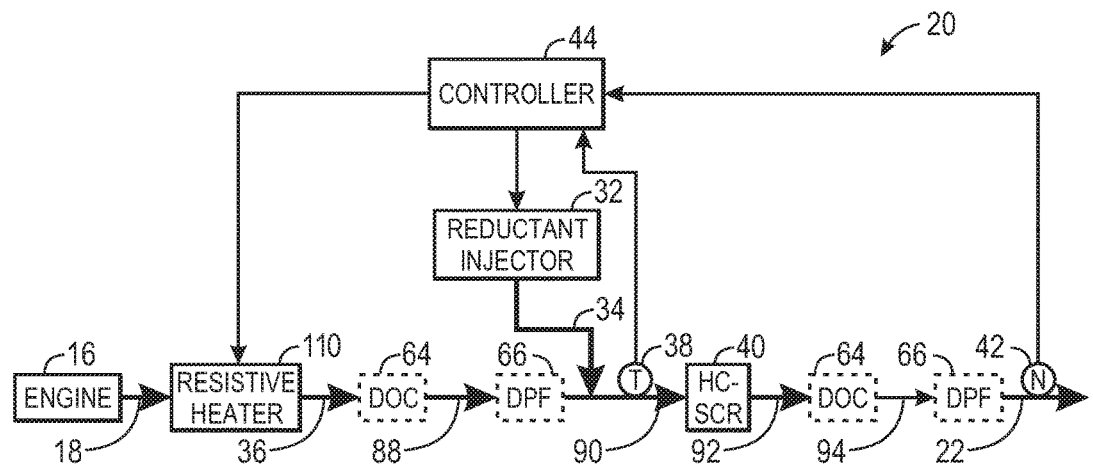
FIG. 6 is a schematic diagram of an exhaust treatment system using a resistive heater in accordance with one embodiment of the present invention.

FIG. 6 is a schematic diagram of an exhaust treatment system 20 that uses a resistive heater 110 as the exhaust stream heater 30. Those components in system 20 of FIG. 6 that are identical to components of FIG. 2 are identified using the same reference numerals used in FIG. 2. The exhaust gases 18 may pass through the resistive heater 110 located downstream of the engine 16. Although there may be some flexibility in the placement of the resistive heater 110, it may typically be located upstream of the HC-SCR 40. The resistive heater 110 may include a resistor that converts electric current passing through the resistor from electrical energy to heat energy. In a typical locomotive 14, electrical energy may be obtained from the diesel electric engine. Moreover, the resistive heater 110 is typically used only when the resistive heater 110 functions as the exhaust stream heater 30. When the resistive heater 110 is used as the exhaust stream heater 30, the heat generated from the heater results in the increase of the temperature of the heated exhaust gases 36 discharged from the resistive heater 110.

Downstream of the resistive heater 110, the exhaust treatment system 20 of FIG. 6 may optionally include the DOC 64 or the DPF 66, which are shown hatched in FIG. 6. Details regarding the DOC 64 and the DPF 66 are identical to that described above with respect to FIG. 5. Other aspects of regeneration control are identical to that shown in FIG. 2 and described above. For simplicity, the duration module 46 and schedule module 48 of FIG. 2 are not shown in FIG. 6, although they may be used when the resistive heater 110 is used as the exhaust stream heater 30.

Figure 7:
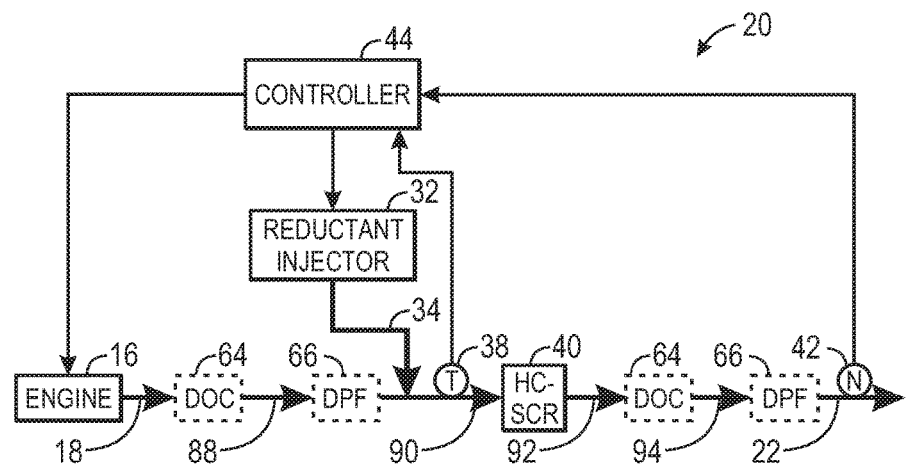
FIG. 7 is a schematic diagram of an exhaust treatment system configured to manipulate engine performance in accordance with one embodiment of the present invention.

FIG. 7 is a schematic diagram of an exhaust treatment system 20 that uses the engine 16 as the exhaust stream heater 30. Those components in system 20 of FIG. 7 that are identical to components of FIG. 2 are identified using the same reference numerals used in FIG. 2. When regeneration is called for, the controller 44 may send a signal to the engine 16 to operate in an inefficient mode, which increases the temperature of the exhaust gases 18. One example of an inefficient mode is operating with turbocharging partially or completely bypassed. Other methods of increasing the temperature of the exhaust gases 18 using the engine 16 may also be possible. When regeneration is complete, the controller 44 may send a signal to the engine 16 to return to normal operation.

Downstream of the engine 16, the exhaust treatment system 20 of FIG. 7 may optionally include the DOC 64 or the DPF 66, which are shown hatched in FIG. 7. Details regarding the DOC 64 and the DPF 66 are identical to that described above with respect to FIG. 5. Other aspects of regeneration control are identical to that shown in FIG. 2 and described above. For simplicity, the duration module 46 and schedule module 48 of FIG. 2 are not shown in FIG. 7, although they may be used when the engine 16 is used as the exhaust stream heater 30.

Figure 8:
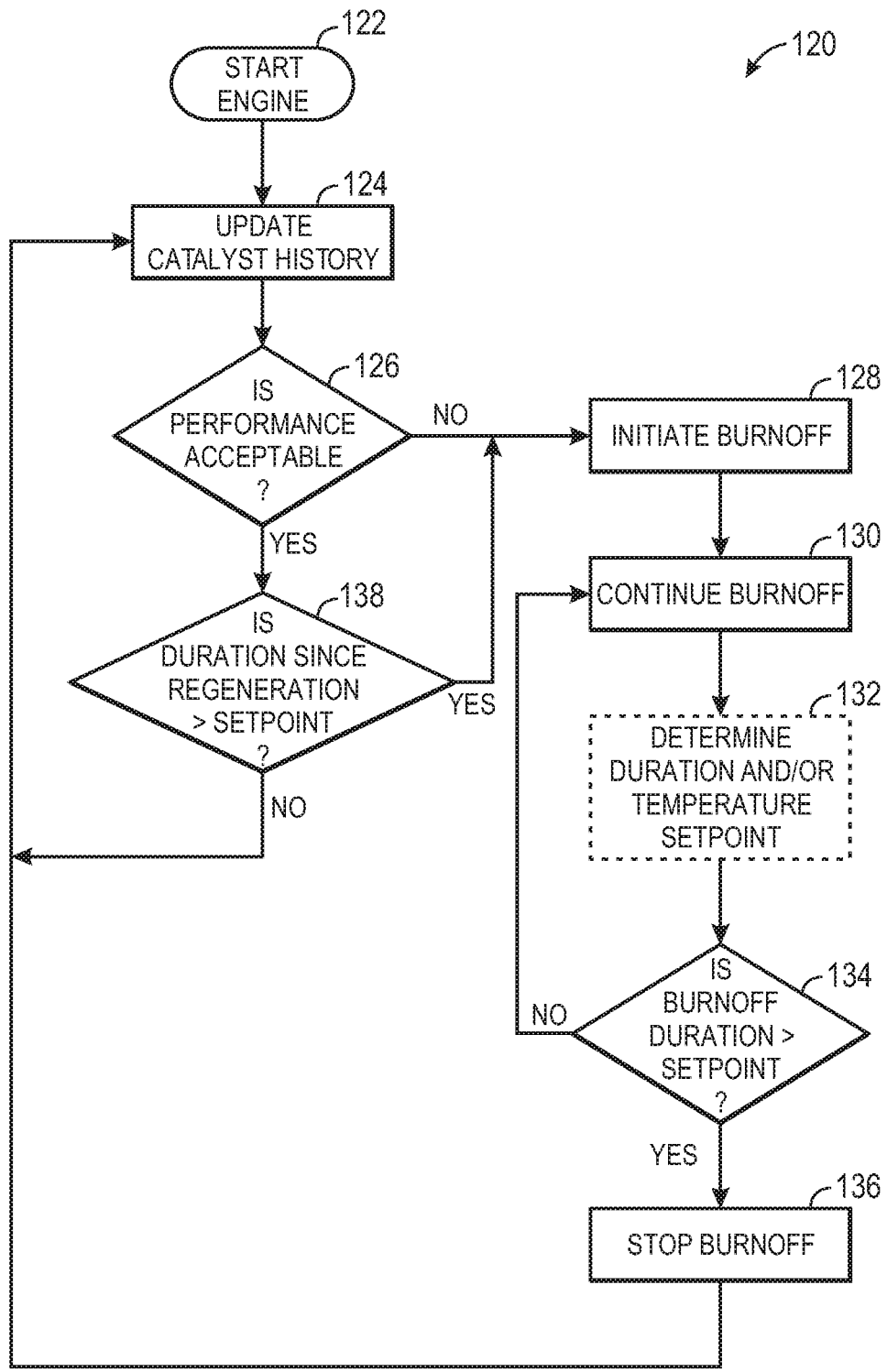
FIG. 8 is a flow chart that shows a process for regeneration of catalyst in accordance with one embodiment of the present invention.

FIG. 8 is an exemplary method flow chart 120 for regeneration of catalyst in a diesel engine exhaust treatment system 20 in accordance with aspects of the present technique. An exemplary routine for catalyst regeneration as explained in FIG. 8 in accordance with aspects of the present technique is presented. The routine may represent one or more of any number of processing strategies, such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages of the invention, but is provided for ease of illustration and description. Although not explicitly illustrated, one or more of the illustrated steps or functions may be repeatedly performed depending on the particular strategy being used.

The method of regeneration of catalyst starts in functional block 122 when the engine 16 is started. The catalyst may be HC-SCR catalyst 40 in certain embodiments of the method. The catalyst history is updated as in functional block 124. This may include recording the date and time the engine 16 is started and monitoring the temperature of the exhaust gases directed to the HC-SCR catalyst 40. Next, the controller 44 monitors the catalyst performance as in functional block 126. In certain embodiments, the measure of catalyst performance may be based on a measurement of the $NO_x$ sensor 42. The setpoint that the catalyst performance is compared against may be based on an emission control regulation. If the catalyst performance is unacceptable, the controller 44 may initiate a burnoff as in functional block 128. Burnoff may refer to increasing the temperature above the temperature sufficient to desorb or oxidize the HC, which desorbs or oxidizes unwanted adsorbed species from the catalyst. Burnoff may be initiated by increasing the temperature of the exhaust gases 18 from the engine using the exhaust stream heater 30. After the burnoff is initiated, burnoff may continue as in functional block 130. The setpoint may be determined based on the catalyst history as in optional functional block 132 (shown hatched in FIG. 8). Specifically, if the HC-SCR catalyst 40 has operated at high exhaust gas temperatures, the burnoff duration or temperature setpoint may be increased. In this way, the more difficult deposits formed at high temperatures may be more easily removed. Alternatively, the setpoint may be adjusted based on measurements of the $NO_x$ sensor 42. Specifically, the setpoint may be quickly reduced as soon as the concentration of $NO_x$ measured by the sensor 42 falls below a threshold. If functional block 132 is omitted, the burnoff duration or temperature setpoint is fixed based on either operational data or theoretical calculations and is not determined by the controller 44. In certain embodiments, the burnoff duration may be between approximately 1 to 10 minutes, 2 to 7 minutes, or 2 to 3 minutes. In other embodiments, the burnoff temperature may be between approximately 400 to 600 degrees Celsius, 425 to 500 degrees Celsius, or 440 to 460 degrees Celsius. Next, the controller 44 monitors the catalyst burnoff as in functional block 134. If the burnoff has not progressed for as long as the setpoint calls for, burnoff continues as in functional block 130. On the other hand, once the burnoff duration setpoint is reached, burnoff is discontinued as in functional block 136. Specifically, the controller 44 sends a signal to the exhaust stream heater 30 to stop heating the exhaust gases 18. Subsequently, the catalyst history is updated again as in functional block 124. This may include recording the date and time burnoff is stopped.

Returning to functional block 126, if the catalyst performance is acceptable, the controller 44 monitors the time since the last regeneration as in functional block 138. The setpoint may be fixed based on either operational data or theoretical calculations. Alternatively, the setpoint may be adjusted based on measurements of the $NO_x$ sensor 42. With either method of determining the setpoint, if enough time has passed to exceed the duration setpoint, burnoff is initiated as in functional block 128. If enough time has not passed, the catalyst history is updated again as in functional block 124.

Therefore, according to aspects of the present technique, it is possible to improve $NO_x$ conversion efficiency of a catalyst by removing adsorbed contaminants, such as HC and soot, from catalyst storage sites. This can be accomplished by a regeneration process wherein the temperature of the catalyst is maintained above a predetermined temperature for a sufficient amount of time to desorb or oxidize the HC and soot deposits.

Experimental Data and Simulations

Figure 9:
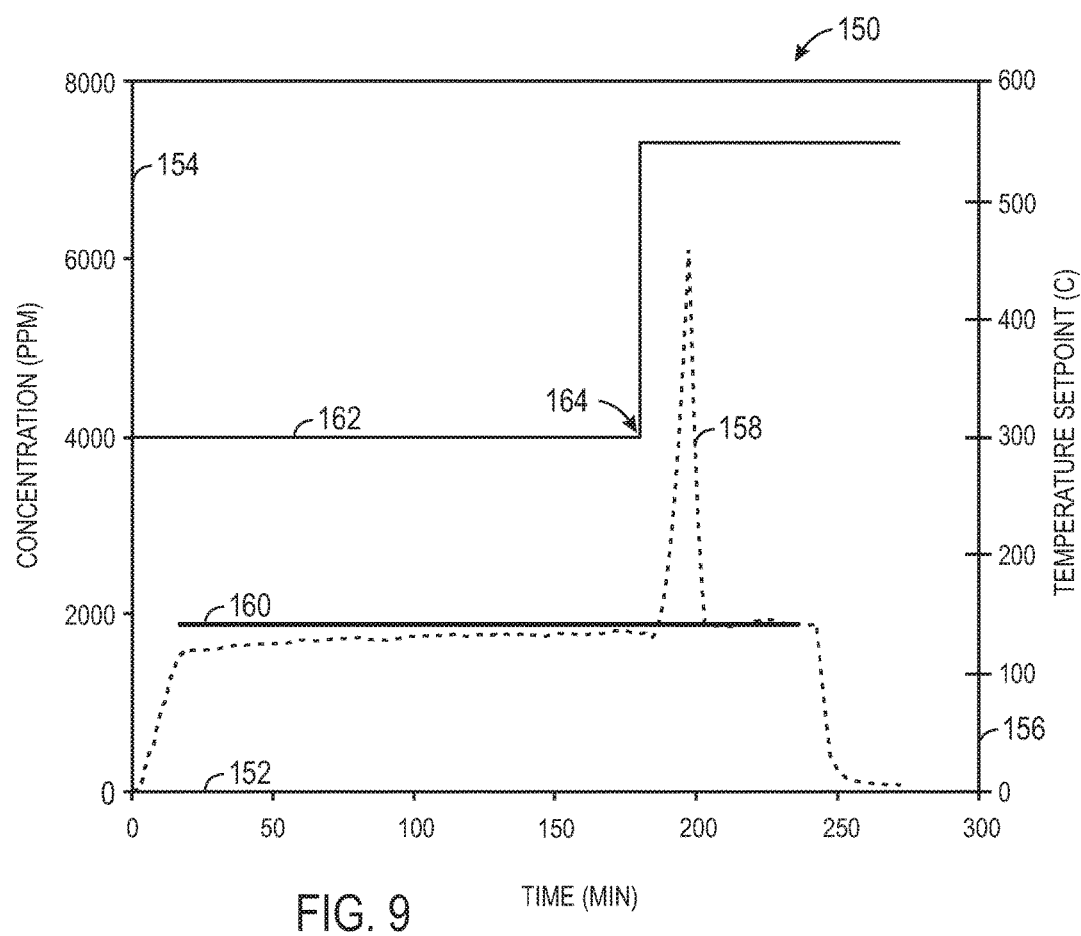
FIG. 9 is a graph showing adsorption and desorption of HC from catalyst in accordance with one embodiment of the present invention.

FIG. 9 shows measured performance data 150 of the adsorption and desorption of HC from the HC-SCR catalyst 40. An x-axis 152 represents time in minutes, a first y-axis 154 represents a concentration of CO and $CO_2$, referred to collectively as $CO_x$ in the discharged exhaust gases 22 in ppm, and a second y-axis 156 represents a temperature setpoint of the heated exhaust gases 36 in degrees C. A first curve 158 shows a change in the $CO_x$ concentration as a function of time, a second curve 160 represents a baseline $CO_x$ concentration, and a third curve 162 shows the temperature setpoint as a function of time. The baseline curve 160 represents the concentration of $CO_x$ in the discharged exhaust gases 22 if no HC were being adsorbed on the HC-SCR catalyst 40. During the period from 0 minutes to about 180 minutes, some HC are being adsorbed on the HC-SCR catalyst 40. Thus, there is a gap between curve 158 and curve 160, which represents the amount of HC being adsorbed. At a point 164, the temperature setpoint of the heated exhaust gases 36 is increased to initiate regeneration. As shown in FIG. 9, curve 158 spikes upward representing the HC being desorbed or oxidized from the HC-SCR catalyst 40. Curve 158 and curve 160 match after the peak in curve 158 because the system is at a high temperature and all of the reductant is being combusted, thereby no adsorption of HC is occurring. To show that the catalyst has been regenerated, it is helpful to see how $NO_x$ conversion varies as shown in FIG. 11 below.

Figure 10:
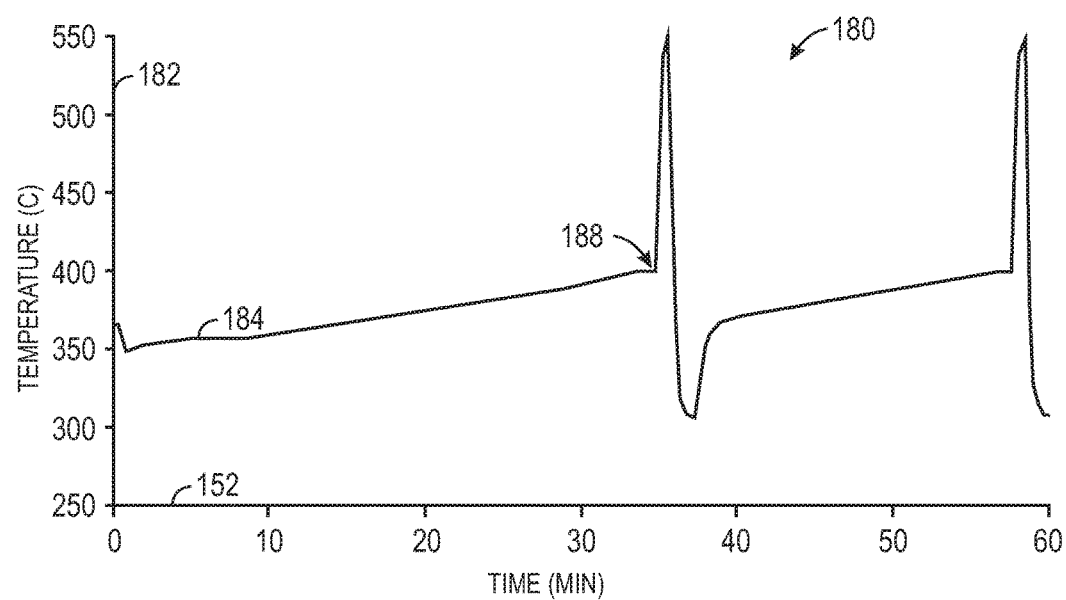
FIG. 10 is a graph showing how a temperature setpoint varies during catalyst operation in accordance with one embodiment of the present invention.
Figure 11:
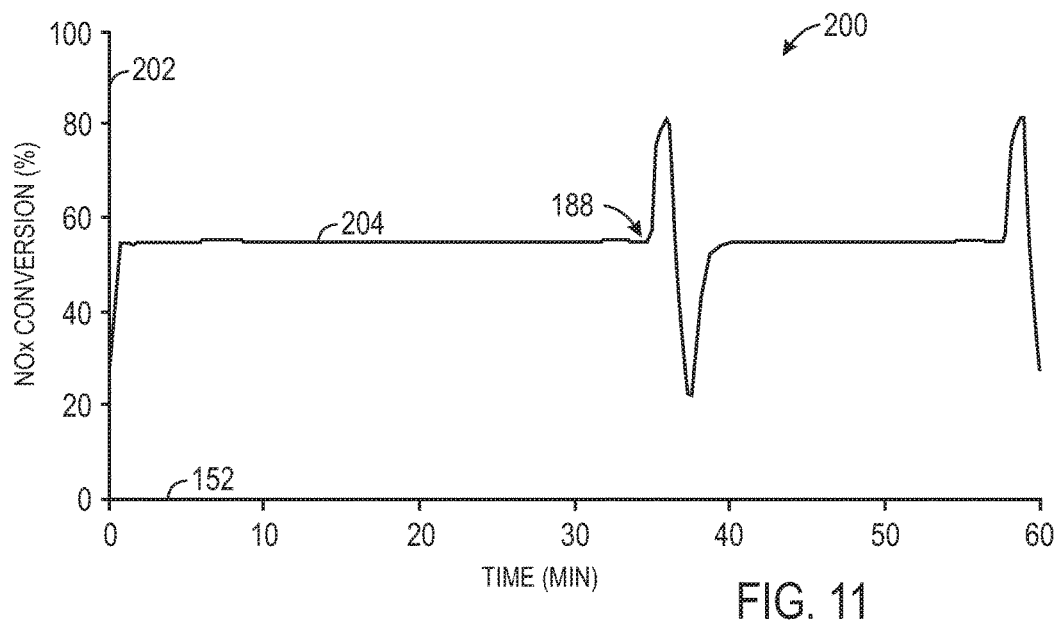
FIG. 11 is a graph showing how a $NO_x$ conversion varies during catalyst operation in accordance with one embodiment of the present invention.
Figure 12:
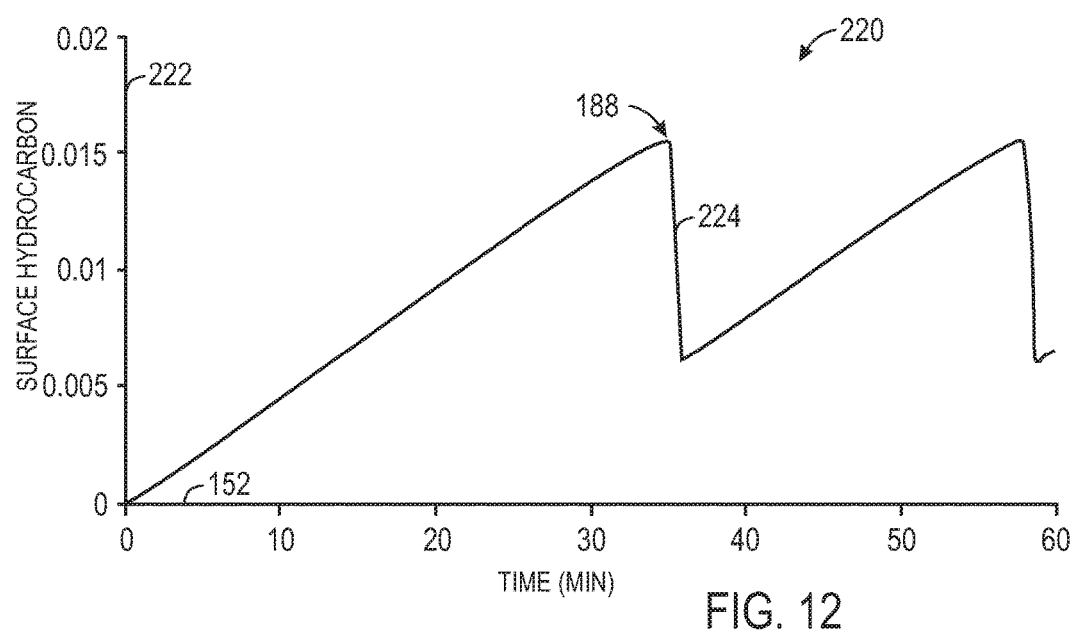
FIG. 12 is a graph showing how a catalyst surface HC coverage varies during catalyst operation in accordance with one embodiment of the present invention.

FIGS. 10-12 show modeling results based on experimental data such as that shown in FIG. 9. Thus, the curves shown are based on theoretical simulations. FIG. 10 shows how a temperature setpoint varies during operation of the HC-SCR catalyst 40. As with FIG. 9, the x-axis 152 represents the time in minutes and a y-axis 182 represents the temperature setpoint in degrees Celsius. A curve 184 shows a change in the temperature setpoint as a function of time. Here, the temperature setpoint may be used to control any of the exhaust stream heaters 30 discussed above. As shown in FIG. 10, the temperature setpoint may gradually increase from 0 minutes to about 35 minutes to compensate for deactivation of the HC-SCR catalyst 40. As the HC-SCR catalyst 40 deactivates, a higher temperature of the heated exhaust gases 36 may be required to achieve the same $NO_x$ reduction in the discharge exhaust gases 22. At a point 188, regeneration is initiated as represented by the spike in temperature setpoint. Once regeneration is complete, the temperature setpoint may be reduced and then gradually increased again to compensate for deactivation of the HC-SCR catalyst 40.

FIG. 11 shows how $NO_x$ conversion varies during operation of the HC-SCR catalyst 40. As with FIG. 9, the x-axis 152 represents the time in minutes. A y-axis 202 represents a percent conversion of $NO_x$. A curve 204 shows a change in the $NO_x$ conversion as a function of time. As shown in FIG. 11, the $NO_x$ conversion remains approximately steady up to about 35 minutes. During this time, the temperature setpoint gradually increases to compensate for deactivation of the HC-SCR catalyst 40, thereby maintaining an approximately steady $NO_x$ conversion of about 55%. At a point 188, the conversion dips below the desired limit and regeneration is initiated as represented by the spike in $NO_x$ conversion. The higher temperature setpoint results in more $NO_x$ being converted. Once regeneration is complete, the $NO_x$ conversion returns to about 55%.

FIG. 12 shows how HC surface coverage varies during operation of the HC-SCR catalyst 40. As with FIG. 9, the x-axis 152 represents the time in minutes. A y-axis 222 represents the mass fraction of the surface coverage of the HC-SCR catalyst 40 by HC. A curve 224 shows a change in the mass fraction of surface coverage by HC as a function of time. As shown in FIG. 12, the mass fraction of surface coverage by HC gradually increases up to about 35 minutes, representing the gradual deactivation of the HC-SCR catalyst 40. As more of the surface of the HC-SCR catalyst 40 becomes covered with HC, less is available for $NO_x$ conversion. At a point 188, regeneration is initiated as represented by the sharp reduction in surface HC coverage. Once regeneration is complete, the mass fraction of surface coverage by HC gradually increases until the next regeneration is initiated.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An exhaust treatment system, comprising:
   a catalyst that is in direct contact with an exhaust stream;
   at least one sensor that senses a system parameter and produces one or more signals corresponding to the system parameter; and
   a controller that is configured to receive the one or more signals and control catalyst performance based on the one or more signals by regenerating the catalyst, wherein regenerating the catalyst comprises:
   increasing a temperature of the exhaust stream flowing to the catalyst; and
   directing a reductant injector to adjust a flow rate of reductant being injected into the exhaust stream flowing to the catalyst; and
   wherein the controller regenerates the catalyst at a temperature and for a duration based on the temperature of the exhaust stream flowing to the catalyst since the catalyst was last regenerated.

2. The system of claim 1, wherein the catalyst comprises a hydrocarbon selective catalytic reduction (HC-SCR) catalyst.

3. The system of claim 1, wherein regenerating the catalyst comprises operating at an oxygen concentration greater than about 3%.

4. The system of claim 1, wherein a respective system parameter comprises at least one of:
   a post-catalyst concentration of $NO_x$ in the exhaust stream;
   a pre-catalyst concentration of $NO_x$ in the exhaust stream;
   a duration the catalyst has been in direct contact with the exhaust stream since the catalyst was last regenerated;
   an amount of exhaust that has been in direct contact with the catalyst since the catalyst was last regenerated;
   a mass or volumetric flow rate of the exhaust stream that has been in direct contact with the catalyst since the catalyst was last regenerated;
   a mass or volumetric flow rate of a fuel stream and/or an air stream directed to a source of the exhaust stream since the catalyst was last regenerated;
   a speed and/or a power of the source of the exhaust stream;
   a temperature of the exhaust stream flowing to the catalyst; or
   any combination thereof.

5. The system of claim 1, wherein catalyst performance comprises a post-catalyst concentration of $NO_x$ in the exhaust stream.

6. The system of claim 1, wherein increasing the temperature of the exhaust stream flowing to the catalyst comprises using an exhaust stream heater.

7. The system of claim 6, wherein the exhaust stream heater comprises a homogeneous burner that burns fuel, a diesel oxidation catalyst that combusts fuel catalytically, an electric heater that heats the exhaust stream, or any combination thereof.

8. The system of claim 1, wherein increasing the temperature of the exhaust stream flowing to the catalyst comprises operating a source of the exhaust stream in a mode that causes increased exhaust stream temperature.

9. The system of claim 8, wherein the mode that causes increased exhaust stream temperature comprises operating the source of the exhaust stream inefficiently, bypassing a turbocharger, or any combination thereof.

10. The system of claim 1, wherein the temperature of the exhaust stream flowing to the catalyst is increased to about 450 degrees Celsius to 500 degrees Celsius.

11. A method for treating an exhaust, comprising:
    passing an exhaust stream in direct contact with a catalyst;
    sensing a system parameter by at least one sensor and producing one or more signals corresponding to the system parameter;
    transmitting the one or more signals to a controller; and
    controlling catalyst performance based on the one or more signals by regenerating the catalyst, wherein regenerating the catalyst comprises:
    increasing a temperature of the exhaust stream flowing to the catalyst; and
    adjusting a flow rate of a reductant being injected into the exhaust stream flowing to the catalyst;
    wherein the controller regenerates the catalyst at a temperature for a duration based on the temperature of the exhaust stream flowing to the catalyst since the catalyst was last regenerated.

12. The method of claim 11, wherein the catalyst comprises a hydrocarbon selective catalytic reduction (HC-SCR) catalyst.

13. The method of claim 11, wherein regenerating the catalyst comprises operating at an oxygen concentration greater than about 3%.

14. The method of claim 11, wherein a respective system parameter comprises:
- a post-catalyst concentration of $NO_x$ in the exhaust stream;
- a pre-catalyst concentration of $NO_x$ in the exhaust stream;
- a duration the catalyst has been in direct contact with the exhaust stream since the catalyst was last regenerated;
- an amount of exhaust that has been in direct contact with the catalyst since the catalyst was last regenerated;
- a mass or volumetric flow rate of the exhaust stream that has been in direct contact with the catalyst since the catalyst was last regenerated;
- a mass or volumetric flow rate of a fuel stream and/or an air stream directed to a source of the exhaust stream since the catalyst was last regenerated;
- a speed and/or a power of the source of the exhaust stream;
- a temperature of the exhaust stream flowing to the catalyst; or
- any combination thereof.

15. The system of claim 11, wherein catalyst performance comprises a post-catalyst concentration of $NO_x$ in the exhaust stream.

16. The system of claim 11, wherein increasing the temperature of the exhaust stream flowing to the catalyst comprises using an exhaust stream heater.

17. The system of claim 16, wherein the exhaust stream heater burns fuel in a homogeneous burner, combusts fuel catalytically in a diesel oxidation catalyst fuel, heats the exhaust stream using an electric heater, or any combination thereof.

18. The system of claim 11, wherein increasing the temperature of the exhaust stream flowing to the catalyst comprises operating a source of the exhaust stream in a mode that causes increased exhaust stream temperature.

19. The system of claim 18, wherein the mode that causes increased exhaust stream temperature comprises operating the source of the exhaust stream inefficiently, bypassing a turbocharger, or any combination thereof.

20. The system of claim 11, wherein the temperature of the exhaust stream flowing to the catalyst is increased to about 450 degrees Celsius to 500 degrees Celsius.

21. A fuel-burning system comprising:
- a catalyst that is connected to a source of an exhaust stream and is in direct contact with the exhaust stream;
- a sensor that senses a concentration of $NO_x$ in the exhaust stream and produces a signal corresponding to the concentration of $NO_x$ in the exhaust stream; and
- a controller that is configured to receive the signal, compare a value of the concentration of $NO_x$ in the exhaust stream with a setpoint, and increase a temperature of the exhaust stream flowing to the catalyst and adjust a flow rate of reductant being injected into the exhaust stream flowing to the catalyst to oxidize hydrocarbons disposed on the catalyst if the value of the concentration of $NO_x$ in the exhaust stream is greater than the setpoint; and
- wherein the controller regenerates the catalyst at a temperature and for a duration based on the temperature of the exhaust stream flowing to the catalyst since the catalyst was last regenerated.

22. The system of claim 21, wherein the source of the exhaust stream comprises a diesel engine that comprises at least one cylinder that produces the exhaust stream.

23. The system of claim 22, wherein the diesel engine is disposed in at least one of: a locomotive, a passenger vehicle, a transport vehicle, or a stationary device.

24. The system of claim 21, wherein oxidizing hydrocarbons comprises operating at an oxygen concentration greater than about 3%.

25. A method for regenerating a catalyst, comprising:
- comparing a measure of catalyst performance against a performance setpoint and initiating a burnoff operation if the measure of catalyst performance is less than the performance setpoint;
- comparing a duration since a previous burnoff operation against a burnoff schedule setpoint and initiating the burnoff operation if the duration since the previous burnoff operation is greater than the burnoff schedule setpoint;
- comparing a duration since initiating the burnoff operation against a burnoff duration setpoint and stopping the burnoff operation if the duration since initiating the burnoff operation is greater than the burnoff duration setpoint;
- updating a catalyst history with burnoff information; and
- determining the burnoff duration setpoint based on catalyst operating temperature since the previous burnoff operation.

* * * * *